J. W. REYNOLDS.
LOADING AND UNLOADING APPARATUS.
APPLICATION FILED MAR. 9, 1908.
909,222.
Patented Jan. 12, 1909.
2 SHEETS—SHEET 1.
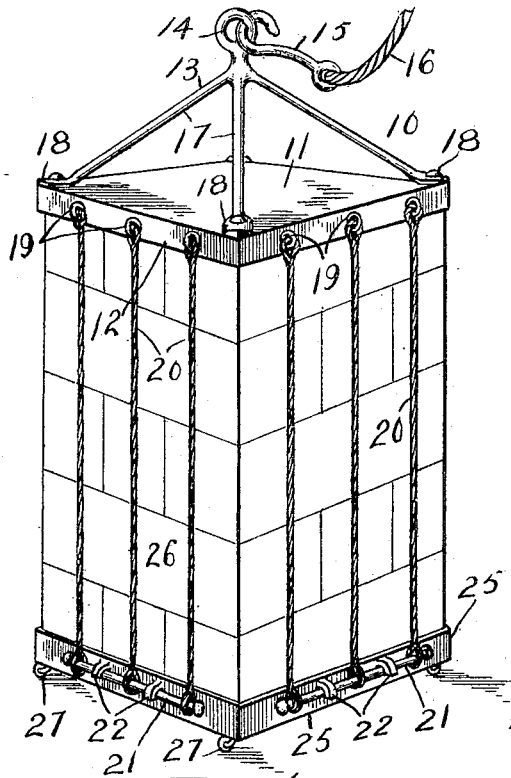
Fig. 1.
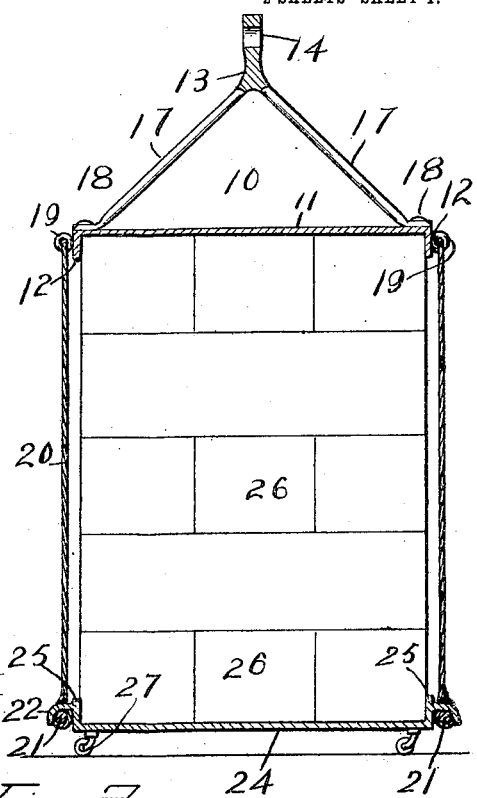
Fig. 2.
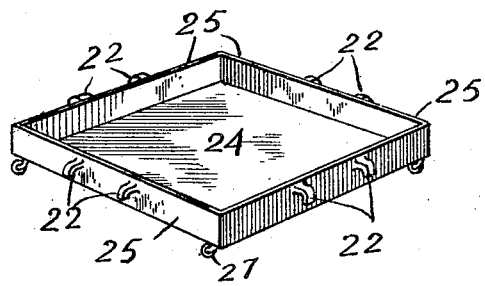
Fig. 3.
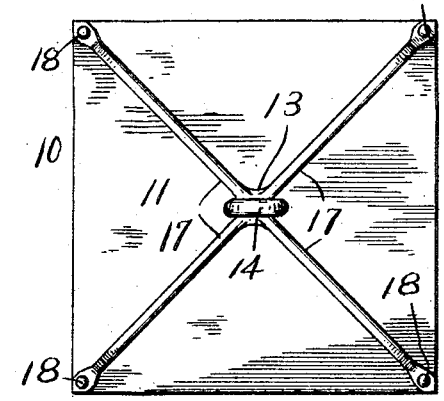
Fig. 4.
Witnesses
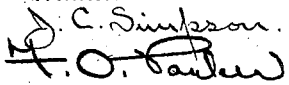
Inventor
John W. Reynolds.
Attorneys J. W. REYNOLDS.
LOADING AND UNLOADING APPARATUS.
APPLICATION FILED MAR. 9, 1908.
909,222.
Patented Jan. 12, 1909.
2 SHEETS—SHEET 2.
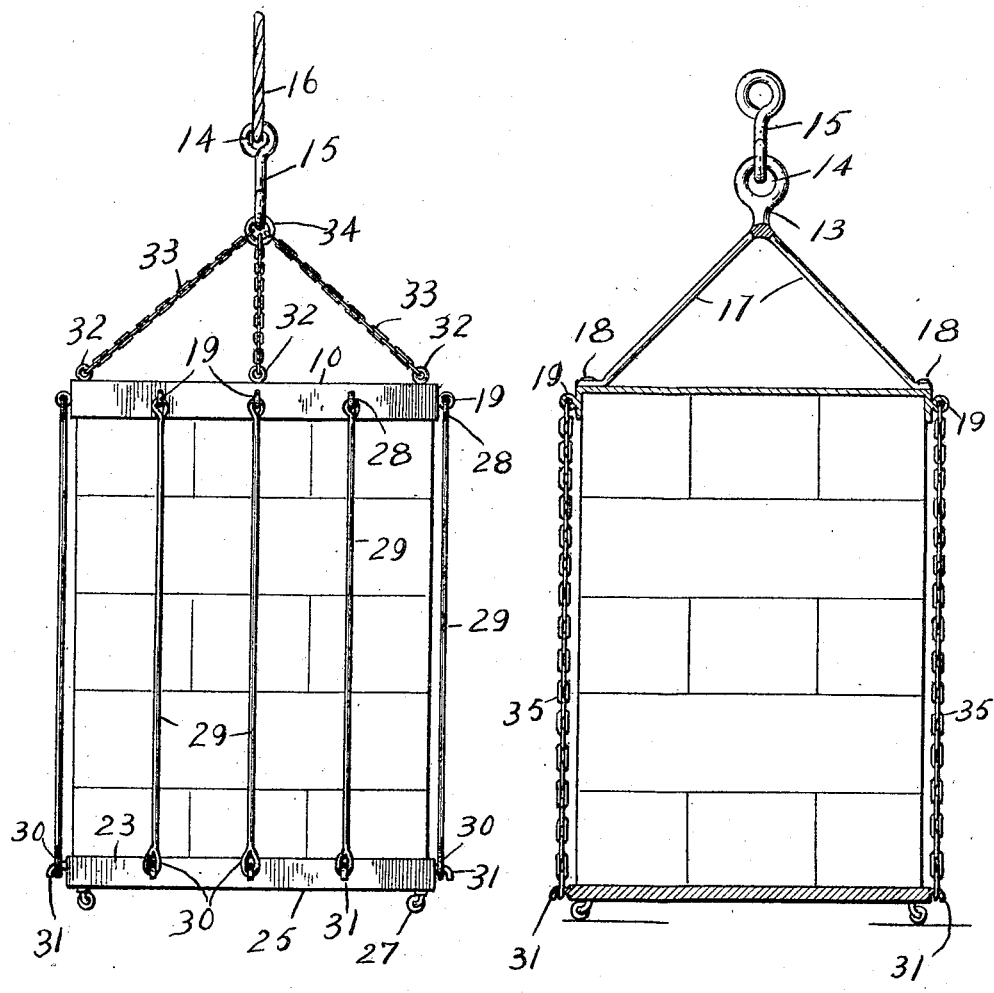
Fig. 5.    Fig. 6.
Witnesses
Inventor
John W. Reynolds.
Attorneys

UNITED STATES PATENT OFFICE.

JOHN W. REYNOLDS, OF NEW YORK, N. Y.

LOADING AND UNLOADING APPARATUS.

No. 909,222.　　　Specification of Letters Patent.　　Patented Jan. 12, 1909.

Application filed March 9, 1908. Serial No. 420,022.

*To all whom it may concern:*

Be it known that I, JOHN W. REYNOLDS, a citizen of the United States, residing at New York city, in the county of New York, State of New York, have invented certain new and useful Improvements in Loading and Unloading Apparatus; and I do hereby declare the following to be a full, clear, and exact description of the invention, such as will enable others skilled in the art to which it appertains to make and use the same.

The invention relates to a loading and unloading apparatus and more particularly to the class of hoisting and lowering cages for carrying products contained in boxes, crates or the like receptacles, to transport the same from a landing to a vessel or other conveyer.

The primary object of the invention is the provision of a cage having spaced rigid sections forming upper and lower closed frames, one of the same having flexible means such as ropes or chains carried thereby at its sides for detachably connecting the remaining frame to form a unitary structure adapted to receive boxed or crated merchandise either to be hoisted or lowered from one locality to another and to prevent crushing or breaking of the receptacles containing the merchandise during their transportation.

Another object of the invention is the provision of a cage involving a top and bottom rigid frame, the top frame having at predetermined distances means such as eyes for receiving flexible members such as ropes or chains having their free ends united to form unitary extremities for detachable engagement with the bottom frame so as to hold the frames in connected relation and also adapting them for the reception of products which are packed in suitable receptacles so that the same may be hoisted or lowered and discharged in a ship or onto a landing.

In the drawings accompanying and forming a part of this specification is illustrated in detail one advantageous form of embodiment of the invention which, to enable those skilled in the art to produce said invention, will be set forth at length in the following description, while the novelty of the invention will be included in the claims succeeding said description.

In the drawings, Figure 1 is a view in elevation of the invention, Fig. 2 is a longitudinal section thereof, Fig. 3 is a detail perspective view of the bottom sectional frame, Fig. 4 is a plan view of the top sectional frame, Fig. 5 is a side view of a modification, and Fig. 6 is a sectional view of a further modification.

Like characters indicate corresponding parts throughout the several views.

In the drawings the numeral 10 indicates a top frame or section preferably of square shape and formed of metal. It however, may be of any other desirable shape and material and includes an imperforate body portion 11 having side flange as 12 bent at right angles to the body portion 11 to form side walls and connected to the outer face of the body portion near each corner thereof is a spider 13 including a central eye 14 in engagement with a hook 15 carried by a flexible hoisting rope 16. Said spider 13 has angle arms 17, the extremities of which are connected by fastenings as at 18 to the frame 10. It will be apparent that the spider 13 may be formed integral with the frame or section 10 if found desirable. Mounted at suitable distances from each other and secured in the outer faces of the flanges 12 forming the side walls of the frame or section 10 are eyes 19 having connected thereto flexible members such as ropes 20 which depend therefrom and the opposite ends connected to rods as 21 the latter uniting the extremities of the ropes 20 at each side of the frame which is adapted to adjustably engage hook members as 22 which project from the outer faces of flanges 25 forming side walls integral with an imperforate body portion 24 forming a bottom section or frame 25 correspondingly shaped with respect to the frame 10.

It is obvious that when boxed merchandise is to be transported from a landing to a vessel, or vice versa, said boxed merchandise as 26 is stacked one piece upon another in superposed relation upon the lower frame or section 25 until the desired number of boxed merchandise pieces have been positioned on said section 25 then the top section or frame 10 is mounted upon the uppermost row or tier of boxed merchandise and the flexible means such as the ropes 20 at the sides of said section or frame and depending therefrom are drawn taut so that the rod 21 forming the unitary terminal of said flexible ropes 20 at each side of the frame is engaged with the hooks 22 carried by the flanges 23 on the bottom frame 25 thereby holding the top frame or section 10 and the bottom frame or section 25 in connected relation so that the merchandise held therebetween and within the flexible sides formed by the ropes 20 can be hoisted, lowered or transported to any desirable locality. At the under side of the body portion 24 of the frame or section 25 are mounted swiveled rollers or casters 27 so that when the section or frame 25 is brought to a landing the same with its load can be moved on the rollers or casters in a convenient manner without the necessity of bodily carrying the load of merchandise.

In Fig. 5 is shown a modification which includes the top section 10 and bottom section 25, the side walls of the top section having eyes 19 in engagement with loop extremities 28 of rods 29, the latter having opposite loop extremities 30 for detachably engaging the hooks 31 formed integral with the side walls 23 of the bottom section 25. Said top section 10 has at opposite corners upwardly projecting eyes 32 in engagement with chains 33, the opposite ends of which are connected to a ring 34 through the medium of which the apparatus may be raised or lowered.

In Fig. 6 is disclosed a further modification, the same including chains 35 one end of the same being connected to the eyes 19 and the opposite ends detachably connected to the hook members 31.

Having described the invention what is claimed is—

1. An apparatus of the class described comprising upper and lower members each having a right angularly disposed flange at its marginal edge, eyes projecting from the flange of one member, hooks projecting from the flange of the other member, and means carried by said eyes and detachably engaging said hooks to unite the members in spaced relation to each other.

2. An apparatus of the class described comprising top and bottom frames, each formed of an imperforate body portion, a plurality of flexible members connected to one of said frames, and means formed on the other of said frames and adapted to be detachably engaged by said flexible members.

3. An apparatus of the class described comprising a pair of frames, each having an imperforate body portion, eyes arranged at the marginal edge of one of said frames, flexible connections, each having one end permanently connected to each of said eyes, and hook members fixed to the other of said frames and adapted to be detachably engaged by the free ends of said flexible connections to hold the frames in spaced suspended relation with respect to each other.

4. An apparatus of the class described comprising a pair of frames, each having an imperforate body portion, eyes arranged at the marginal edge of one of said frames, flexible connections, each having one end permanently connected to each of said eyes, hook members fixed to the other of said frames and adapted to be detachably engaged by the free ends of said flexible connection to hold the frames in spaced suspended relation with respect to each other, and a spider fixed to the uppermost frame and having an eye.

5. An apparatus of the class described comprising upper and lower rigid frames, having imperforate body portions, spaced eyes on the upper frame at each side thereof, flexible connections in engagement with said eyes and depending from the uppermost frame, cross bars united to the free ends of said flexible connection, and hooks carried on the lower frame for detachably connecting the bars to the latter and to hold the said upper and lower frames in spaced relation to each other.

6. An apparatus of the class described comprising spaced rigid frames having imperforate body portions, spaced eyes on one of said frames at each side thereof, flexible members connected to the eyes and depending therefrom, cross bars connected to the free terminals of the said flexible members, and means on the other frame detachably engaging said bars.

In testimony whereof, I affix my signature, in presence of two witnesses.

JOHN W. REYNOLDS.

Witnesses:
ARTHUR R. LEWIS,
A. M. PALMER.